(12) United States Patent
Hagy

(10) Patent No.: US 8,944,459 B1
(45) Date of Patent: Feb. 3, 2015

(54) COLLAPSIBLE WAGON

(71) Applicant: Amanda L. Hagy, New Braunfels, TX (US)

(72) Inventor: Amanda L. Hagy, New Braunfels, TX (US)

(*) Notice: Subject to any disclaimer, the term of this patent is extended or adjusted under 35 U.S.C. 154(b) by 170 days.

(21) Appl. No.: 13/771,654

(22) Filed: Feb. 20, 2013

Related U.S. Application Data

(60) Provisional application No. 61/600,795, filed on Feb. 20, 2012.

(51) Int. Cl.
*B62D 3/02* (2006.01)
*B62B 3/02* (2006.01)

(52) U.S. Cl.
CPC ........................................ *B62B 3/02* (2013.01)
USPC ........................................ 280/657; 280/47.34

(58) Field of Classification Search
USPC ......... 280/639, 640, 650, 651, 652, 654, 656, 280/657, 47.26, 47.34, 79.11
See application file for complete search history.

(56) References Cited

U.S. PATENT DOCUMENTS

| | | | | |
|---|---|---|---|---|
| 1,489,443 A | * | 4/1924 | Kelly | 280/87.01 |
| 1,946,422 A | * | 2/1934 | Carter | 280/87.01 |
| 2,555,767 A | * | 6/1951 | Simonian | 220/6 |
| 2,563,995 A | * | 8/1951 | East | 280/639 |
| 3,305,243 A | * | 2/1967 | Manfredi, Jr. et al. | 280/651 |
| 4,114,914 A | * | 9/1978 | Cohen | 280/30 |
| 4,580,799 A | * | 4/1986 | Quinonez | 280/32.6 |
| 4,957,306 A | * | 9/1990 | Greenberg | 280/652 |
| 5,611,552 A | * | 3/1997 | Miles et al. | 280/32.6 |
| 5,957,482 A | | 9/1999 | Shorter | |
| 6,641,149 B2 | | 11/2003 | Chiappetta et al. | |
| 6,746,039 B2 | * | 6/2004 | Perelli et al. | 280/651 |
| 6,845,991 B1 | | 1/2005 | Ritucci et al. | |
| 7,523,955 B2 | | 4/2009 | Blair | |
| 2003/0025301 A1 | | 2/2003 | Banuelos, III | |
| 2007/0284900 A1 | | 12/2007 | Sze | |
| 2008/0258435 A1 | * | 10/2008 | Blair | 280/639 |
| 2011/0079972 A1 | | 4/2011 | Watson | |
| 2011/0204598 A1 | | 8/2011 | Stevenson | |

* cited by examiner

*Primary Examiner* — J. Allen Shriver, II
*Assistant Examiner* — Bridget Avery
(74) *Attorney, Agent, or Firm* — Robert C. Montgomery; Montgomery Patent & Design

(57) ABSTRACT

A collapsible wagon comprises integral bench seats and a folding construction that can be used to transport children or large household objects. The wagon folds in half to provide a suitcase-sized configuration for purposes of storage and transportation. The wagon further includes a pull handle, large wheels, seat belts, and drink holders.

18 Claims, 5 Drawing Sheets

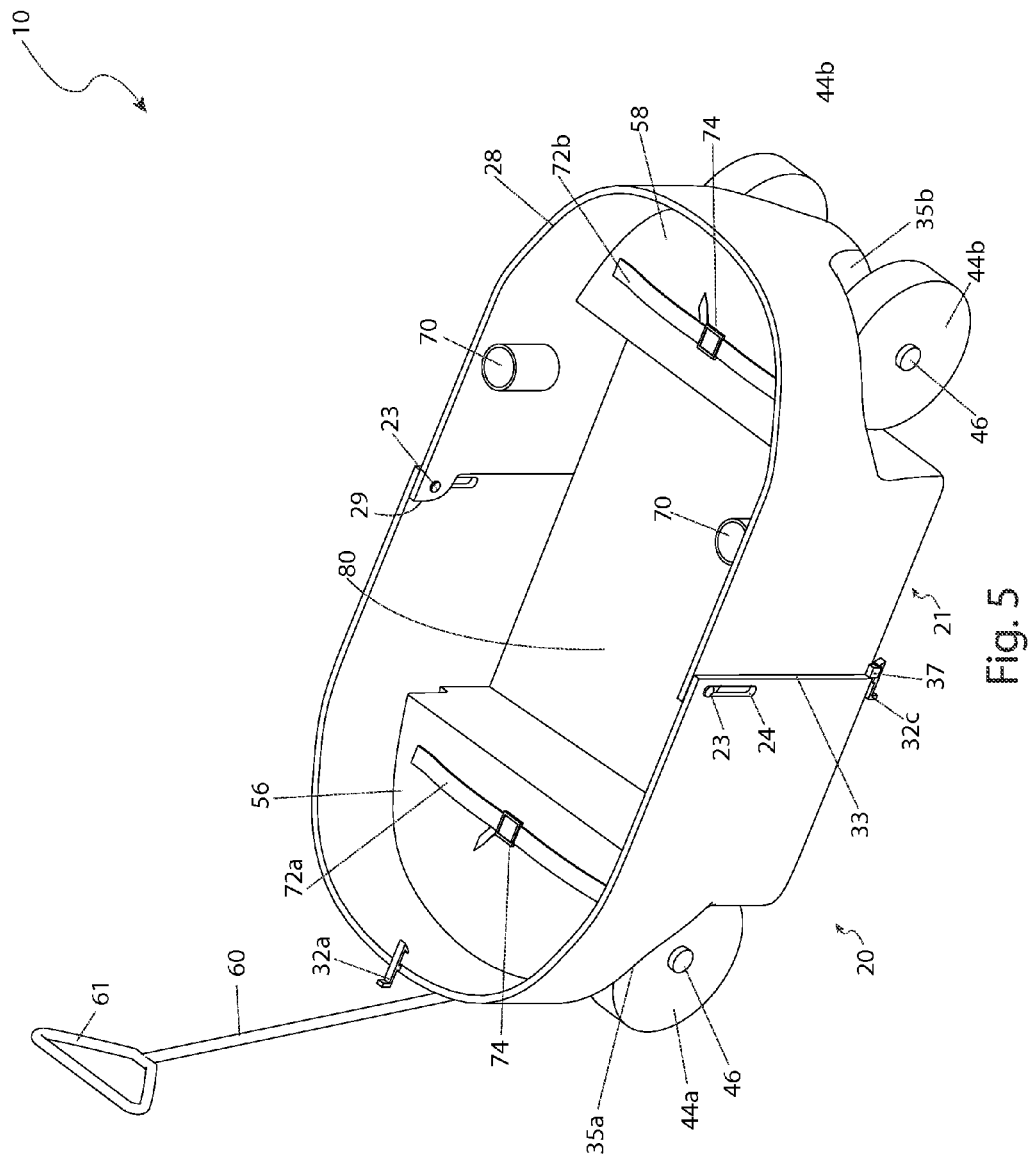

COLLAPSIBLE WAGON

RELATED APPLICATIONS

The present invention was first described in U.S. Patent Provisional No. 61/600,795 filed on Feb. 20, 2012 the entire disclosures of which are incorporated herein by reference.

FIELD OF THE INVENTION

The present invention relate generally to a wagon that is collapsible into a storage configuration capable of being transported by manipulation of a handle.

BACKGROUND OF THE INVENTION

Having children necessitates a means to effectively transport the children and all of the children-adapted accessories in a manner that assists a parent/guardian's busy schedule. The means should also have the dual capacity to entertain, and, in some respects, confine the children in space so as to further assist a parent/guardian. Because lugging children and all of the necessities associated with children can be taxing, the means should be of light weight, compactable, and easily transportable. A child wagon provides such a means.

Child wagons are used extensively to assist parents and guardians with the transportation of their children and child's provisions. Child wagons provide a means to confine a child within a manageable area while affording the ability to transport the child about at a discretionary pace set by the parent/guardian controlling the wagon. An important benefit is that children tend to find the experience amusing and stimulating. Because having children requires the need to have relatively immediate access to a plethora of toys, accessories, and other provisions, wagons should be equipped with the means to carry these items. Furthermore, because the wagon itself becomes one of these accessories, it too should be compact and easily transportable. Therefore, it is desired to have a child wagon that is equipped with the additional features of collapsibility and transportability. It is further desired to improve on the confinement, marshalling, and entertainment capabilities a wagon.

Child wagons exist that are light weight and foldable into a compact configuration. However, these wagons fail to provide the all of the desired features of: child confinement; cargo spacing; entertainment capacity; a compact folding configuration; and, wheeled transportation means while in the compact folded configuration. It is an object of this invention to provide a child wagon that folds into a better compact configuration that is more conducive to transporting the wagon. It is a further object of this invention to provide a child wagon that can be transported on a set of wheels while in its compact configuration. It is a third object of this invention to provide a child wagon that exhibits the above beneficial features with no requirement to assemble/disassemble the wagon in order to place it into its extended/compact configuration.

SUMMARY OF THE INVENTION

The invention relates to a collapsible child wagon having integral bench seats. The wagon collapses into a compact configuration in a manner to afford the ability to maneuver the wagon about on a set of wheels. It is equipped with additional features such as bench seats, seat belts, cup holders, a washable protective bottom panel, and adequate cargo space.

The wagon comprises of a first section and a second section that is pivotly attached to each other so as to afford the ability to fold the sections onto each other. The sections are contoured so that the second section can fold into the first section, thus reducing the overall volume of the wagon in its collapsed configuration. In an extended configuration, each inside section of the wagon is equipped with bench seating and seat belts. This allows a child to be securely seated in a designated spot within the wagon. Cup holders are formed into the walls of the wagon for enhanced entertainment and utility. The wagon sections are designed to provide amble cargo space around the bench seat for adequate marshalling the child provisions. The wagon is provided with wheel wells, which also serve to reduce the overall volume of the wagon. Latches are attached to retain and secure the wagon in its extended and collapsed configurations. A panel is used to cover a bottom portion of the wagon while in an extended state and neatly attaches to the wagon while in a collapsed state. This panel allows a user to protect the wagon from dirt and debris and is easily removable for cleaning. An elongated handle is pivotally attached to a front portion of the front section to assist with maneuverability of the wagon. While in the collapsible configuration, the overall volume of the wagon is no more than an average aircraft carry-on luggage bag. Additionally, the elongated handle can be coupled to the wagon while in the collapsed configuration to allow a user to maneuver it about on the attached wheels.

With the joys of having children, comes the need to have a convenient means to transport the children and all of the child's provisions in a manner that will further assist a parent/guardian in confining and entertaining the child.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
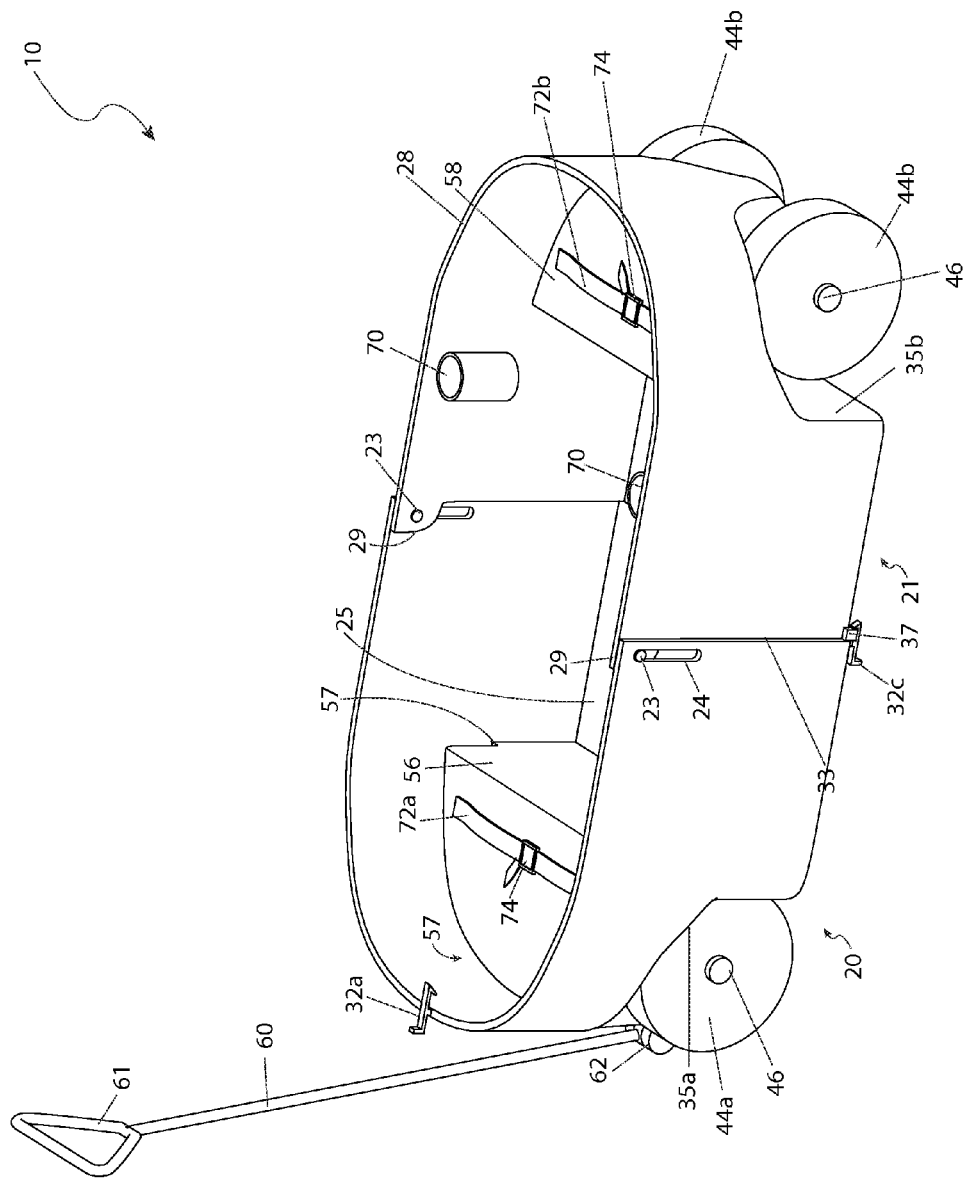
FIG. 1 is a perspective side view of a collapsible wagon depicted in an in-use state, in accordance with the present invention.

DESCRIPTIVE KEY 10 collapsible wagon
20 first section
21 second section
23 pivot pin
24 pin slot
25 first bottom panel
26 first sidewall
27 second bottom panel
28 second sidewall
29 second sidewall end
30 second open end
31 first open end
32a first latch
32b second latch 32c third latch
33 first sidewall end
34 latch recess
35a first wheel well
35b second wheel well
37 post
44a front wheel
44b rear wheel
45 wheel well
46 axle
56 first bench seat
57 recessed area
58 second bench seat
60 handle
61 grip
62 hinge
64 spring clip feature
70 cup holder
72a first seat belt
72b second seat belt
74 release clip
80 bottom panel cover
100 user
105 ground surface

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

In accordance with the invention, the present disclosure will be made to certain embodiments, examples of which are illustrated in the accompanying drawings.

Referring now to FIGS. 1 through 5, which depict a collapsible wagon (herein described as a "device") 10, where like reference numerals represent similar or like parts. The device 10 generally includes a first section 20 and a second section 21. The first section 20 is pivotally attached to the second section 21 and foldable about a pair of pivot pins 23 being inserted into correspondingly aligned pin slots 24. The pin slots 24 are located opposite from each other and are integrally-molded into first sidewall portions 26 of the first section 20. The pivot pins 23 are preferably stationary cylindrical shapes integrally-molded into second sidewall portions 28 of the second section 21. The first section 20 includes a flat first bottom panel 25 and a first sidewall 26 extending upwardly from a perimeter of the first bottom panel 25. In the illustrated embodiment, the first bottom panel 25 has a generally semi-ovular shape and the first sidewall 26 has a curved profile matching the first bottom panel 25. It can be appreciated that the first bottom panel 25 and corresponding first sidewall 26 can have alternative shapes, such as rectangular, square, or the like, and as such should not be viewed as a limiting factor.

The second section 20 includes a second bottom panel 27 and a second sidewall 28 extending upwardly from a perimeter of the second bottom panel 27. In the illustrated embodiment, the second bottom panel 27 has a generally semi-ovular shape and the second sidewall 28 has a curved profile matching the second bottom panel 27. It can be appreciated that the second bottom panel 27 and corresponding second sidewall 28 can have alternative shapes, such as rectangular, square, or the like, and as such should not be viewed as a limiting factor.

Figure 2:
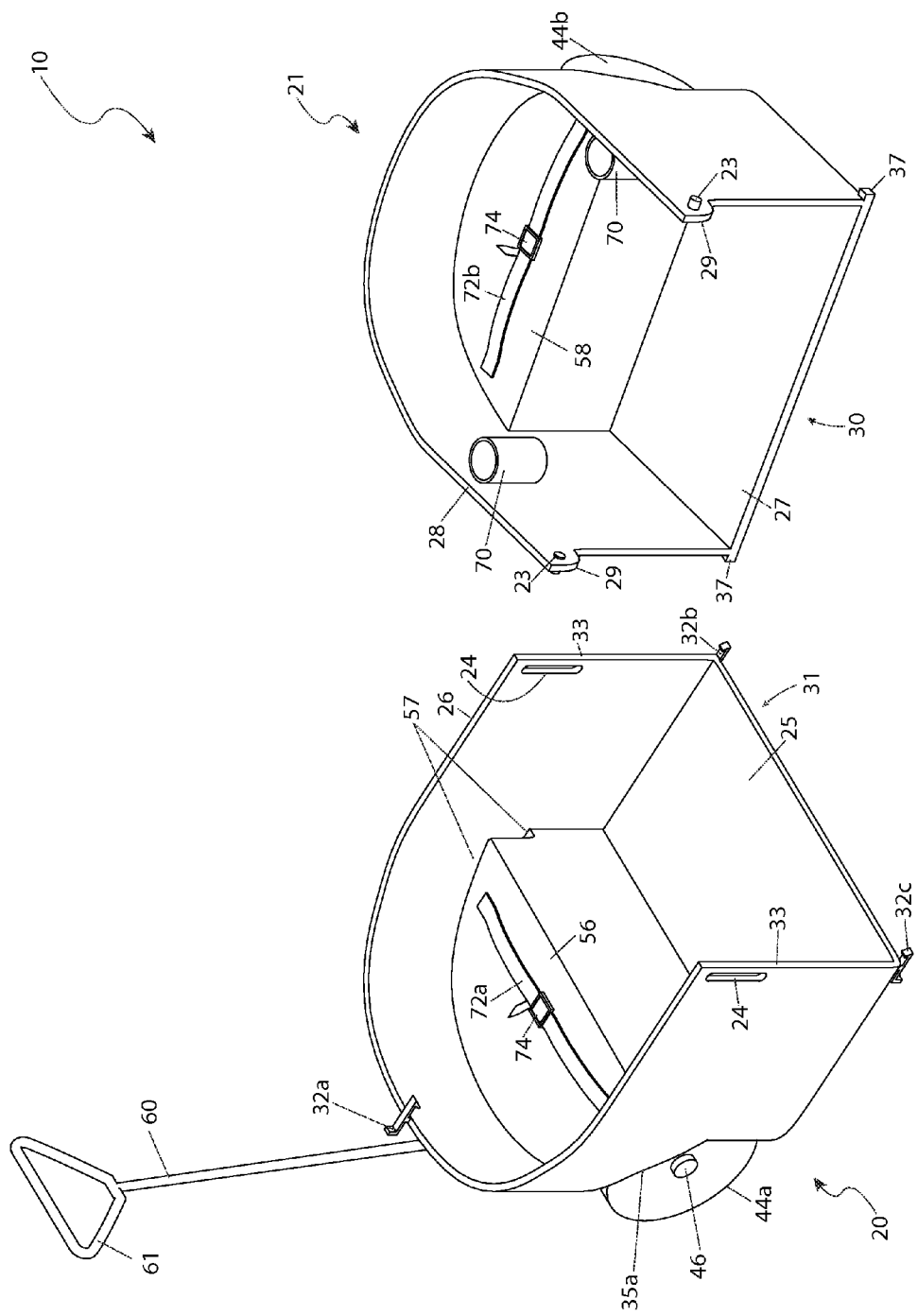
FIG. 2 is an exploded perspective view if the collapsible wagon.
Figure 3:
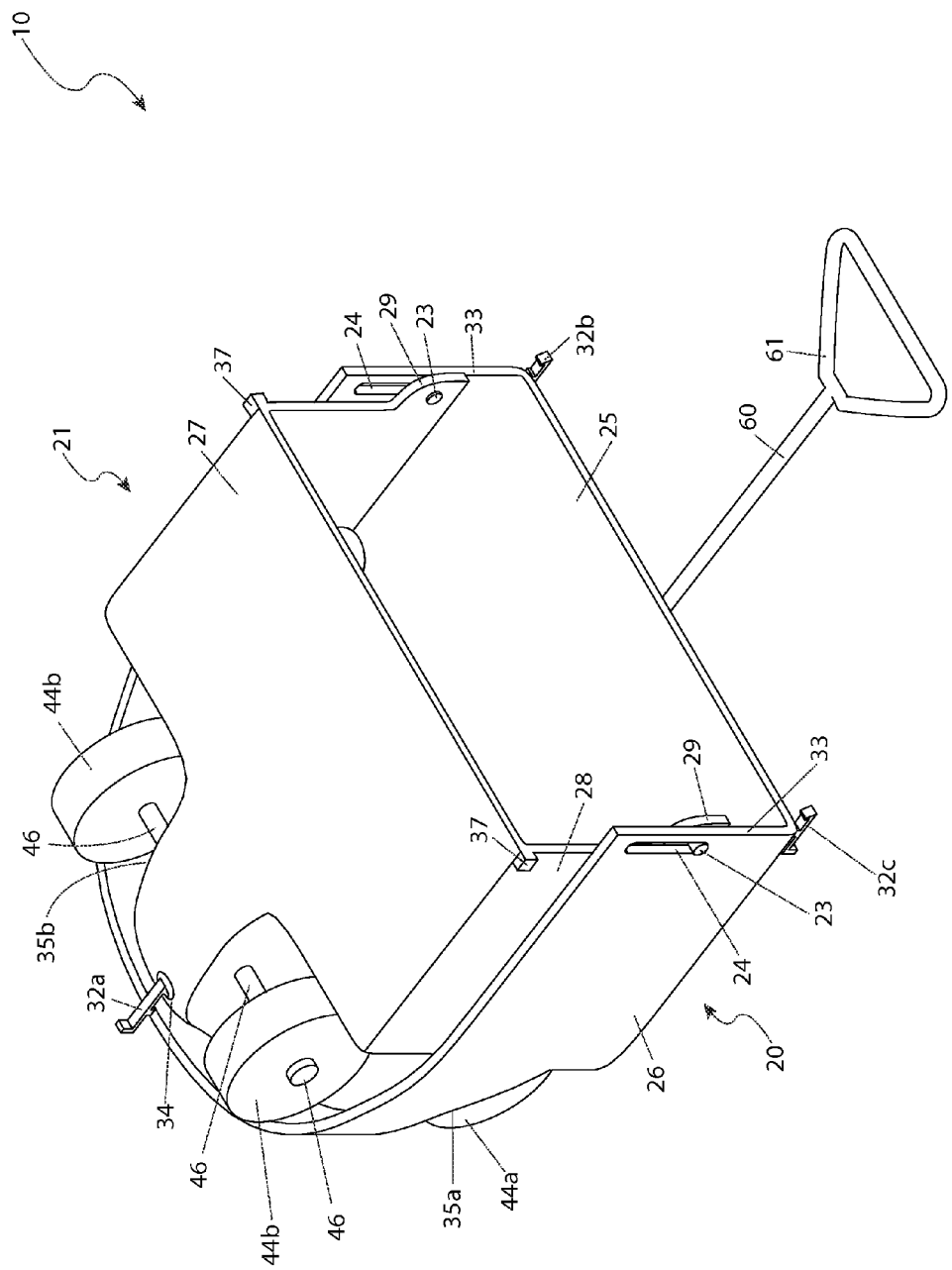
FIG. 3 is a perspective side view of the collapsible wagon depicted in a collapsed state.

As best seen in FIGS. 1 and 2, the second sidewall ends 29 of the second sidewall 28 extend past a second bottom panel open end 30 of the second bottom panel 27. The second sidewall ends 29 extend into the first section 20 such that an exterior surface of the second sidewall 28 is in contact with an interior surface of the first sidewall 26. As best seen in FIGS. 1 and 3, the second section 21 has a slightly smaller diameter than that of the first section 20, such that the second section 21 can be folded upon and reside within the first section 20 when in a collapsed state. The pin slots 24 within the first sidewalls 26 provide for folding and collapsing engagement of the second section 21 within the first section 20 in a compact manner.

The outside edges of the second bottom panel 27 at the second open end 30 extend outwardly beyond the second sidewall 28 having a combined dimension equivalent to the first open end 31. The flat outside vertical edge of the first bottom panel 25 at the first open end 31 and the second bottom panel 27 at the second open end 30 make contact when the device 10 is in the unfolded and in-use state.

A first latch 32a is provided along an upper edge of the first sidewall 26 opposite the first open end 31 for engaging a latch recess 34 located upon a bottom surface of the second bottom panel 27, being aligned with the first latch 32a, to secure the device 10 in the collapsed state. A second latch 32b and a third latch 32c are disposed at each first sidewall end 33 for securing the second section 21 to the first section 20 when unfolded into the in-use state. The second 32b and third 32c latches provide a retention means by mechanically capturing corresponding post portions 37 which protrude outwardly from end portions of the second open end 30 to prevent the bottom panels 25, 27 from separating during use or in situations where force is applied to the seam created between the first section 20 and second section 21.

In certain embodiments, the latches 32a, 32b, 32c are integrally-molded spring-biased hook latches that engage the latch recess 34 and post 37 portions of the device 10. However, it can be appreciated that the latches 32a, 32b, 32c can be any suitable mechanical lock, latch, pin, clamp, or similar mechanism which can secure the sections 20, 21 together when in the in-use state.

The first section 20 comprises a pair of front wheels 44a and the second section 21 comprises a pair of rear wheels 44b. Each pair of wheels 44a, 44b is rotatably coupled to the respective bottom panel 25, 27 opposite the respective open end portions 30, 31. The pairs of wheels 44a, 44b are preferably attached by a central axle 46 that passes through a lower end of each section 20, 21. Each section 20, 21 also includes respective wheel well portions 35a, 35b molded into exterior surfaces of the sections 20, 21 for aesthetic purposes and to minimize the overall size of the device 10.

The first section 20 also includes a first bench seat 56 extending inwardly from the interior surface of the first sidewall 26 opposite the first open end 31. The first bench seat 56 is envisioned to include such items as a cushion or padded top surface. A perimeter portion of the first bench seat 56 includes a circumferential recessed area 57 which forms a gap between the first bench seat 56 and the first sidewall 26 having a width being slightly larger than the thickness of the second sidewall 28. The recessed area 57 receives the top edge of the second sidewall 28 when the second section 21 is folded into the collapsed state. A first seat belt 72a is affixed at opposing ends to the first bench seat 56. The first seat belt 72a comprises a length adjustable belt release clip 74.

The second section 21 also includes a second bench seat 58 extending inwardly from the interior surface of the second sidewall 28 opposite the second open end 30. The second bench seat 58 comprises a second seat belt 72b having a belt release clip 74 and being affixed at opposing ends to the second bench seat 58. A pair of cup holders 70 is integrally-molded or otherwise affixed to opposing interior surfaces of the second sidewall 28.

Figure 4:
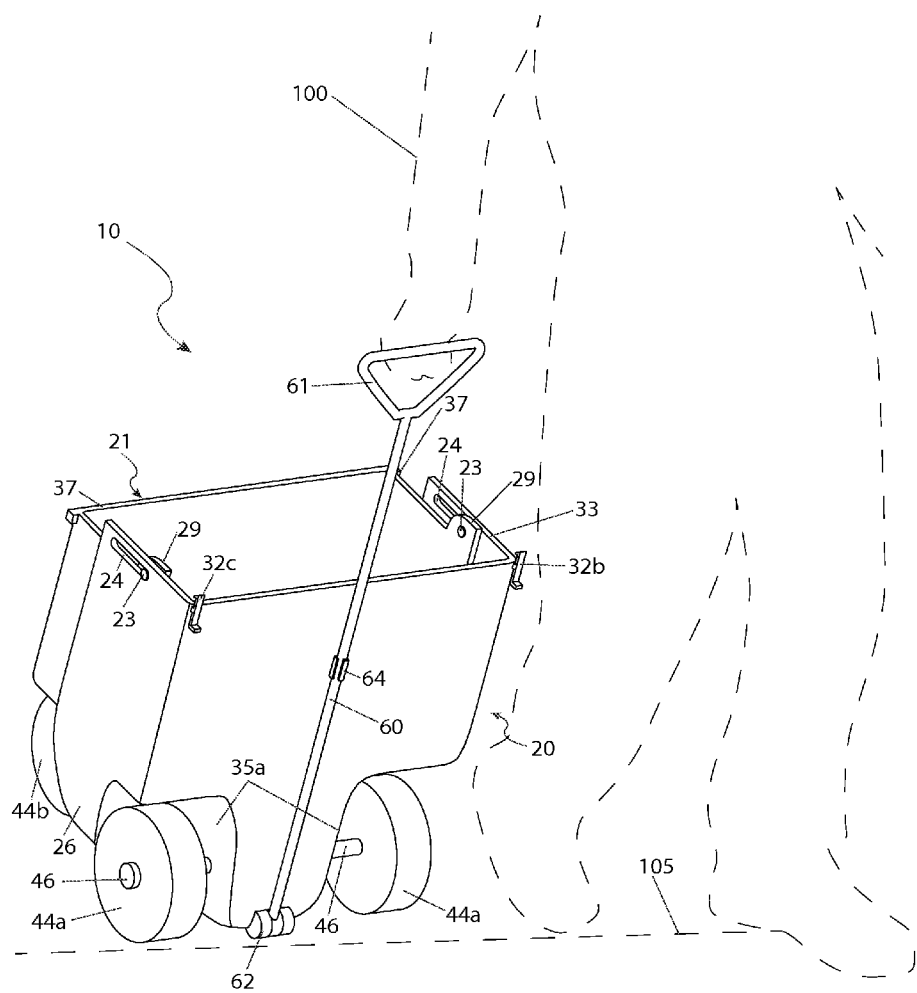
FIG. 4 is an environmental view of the collapsible wagon depicting a transported state; and, FIG. 5 is a perspective side view of the collapsible wagon depicting installation of a bottom panel cover portion 80.

The device 10 comprises an elongated handle 60 being rotatingly attached via a hinge 62 located at a center location of a lower edge of the first section 20 opposite the first open end 31. The handle 60 is permanently attached to the first section 20 and is intended to provide for maneuvering of the device 10 when in the in-use state and includes an ergonomic grip end 61. The handle 60 is rotatable by approximately two-hundred seventy degrees (270°) about the lower hinge portion 62 of the first section 20. As best seen in FIG. 4, when in the collapsed state, the handle 60 is rotatably positioned and secured to a bottom surface of the first bottom panel 25 using a "C"-shaped integral spring clip feature 64. The gripping end of the handle 60 extends outwardly beyond the first and second open ends 30, 31 allowing a user 100 to maneuver the device 10 upon the front wheels 44a like a rolling suitcase over a ground surface 105.

Referring now to FIG. 5, a perspective side view of the device 10 depicting installation of a bottom panel cover portion 80. The bottom panel cover 80 comprises an accessory made using flexible or semi-rigid extruded plastic sheet having a perimeter shape matching a combined shape of the first bottom panel 25 and second bottom panel 27 portions. The bottom panel cover 80 may be placed upon or optionally fastened using snap fasteners or the like, to cover the first bottom panel 25, the second bottom panel 27, and the seam created therebetween, thereby forming a protective and washable surface when the device 10 is unfolded into the in-use state. It is also envisioned that the bottom panel cover 80 may be used to cover an end opening created when the device 10 is in the collapsed state.

The materials required to produce the device 10 are all readily available and well known to manufacturers of goods of this type. It is envisioned that the majority of the components used would be made of plastic in an injection or blow molding process. Such a process would require the design and use of custom molds. The remaining components of the device 10 such as the pull handle 60, wheels 34, axles, fasteners, latches 32a, 32b, 32c, and the like would best be procured from wholesalers and manufacturers that deal in goods of that nature and assembled at a final location. The relatively simple design of the device 10 and the material of construction make it a cost-effective design due to the relatively low material and labor costs involved. Final production of the device 10 would be performed by manufacturing workers of average skill.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 1 through 3.

The method of utilizing the device 10 can be achieved by performing a series of steps: preparing the device 10 in the deployed state by pivoting the second section 21 outwardly away from the first section 20 until the first 31 and second 30 opens ends contact each other; securing the sections 20, 21 together by engaging the second latch 32b and third latch 32c to respective post portions 37; using the device 10 to transport children riders or other objects as desired; folding the device 10 from the in-use state to the collapsed state by temporarily disengaging the second 32b and third 32c latches from post portions 37 of the second section 21; allowing the second section 21 to pivot upwardly about an axis defined by the pivot pins 23; folding the second section 21 into the interior area of the first section 20 between the first sidewall 26; and, attaching the first sidewall 26 to the exterior of the second sidewall 28 by engaging the first latch 32a with the corresponding latch recess 34 to retain the device 10 in the collapsed state.

In the collapsed state, the device 10 can easily fit in the trunk of a car or even the overhead bin of an aircraft. In the in-use state, the device 10 can be used to transport child riders or other objects. The device 10 can be transported by a user 100 in a similar manner as a rolling suitcase by rotating the handle 60 until contacting a bottom surface of the first bottom panel 25 and securing via insertion into the "C"-shaped integral spring clip feature 64. In this position, the handle 60 extends outwardly beyond the first and second open ends 30, 31 enabling the user 100 to maneuver the device 10 upon the front wheels 44a like a rolling suitcase over a ground surface 105.

It can be appreciated that the operational steps can be performed in alternative order and as such any operational description of use should not be viewed as a limiting factor.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A wagon, comprising:
   a first section, comprising:
      a first fore end and a first aft end;
      a first bench seat located at said first fore end;
      a first wheel assembly;
      a handle having a first end pivotally mounted to and located at said first fore end and second end having a gripping element; and,
      a pair of pivot slots adjacent to said first aft end; and,
   a second section, comprising:
      a second fore end and a second aft end;
      a second bench seat located at said second aft end;
      a second wheel assembly; and, a pair of pivoting ears extending forwardly from said second fore end, each of said pair of pivoting ears has a pivot pin extending outwardly therefrom;

wherein each of said pivot pins engage a pivot slot to pivotally motion said second fore end relative to first aft end between a fully deployed configuration and a stored configuration;

wherein said first section and said second section are aligned along a coextensive longitudinal axis when said wagon is in said fully deployed configuration;

wherein a deployed securing means is provided for securing said wagon in said fully deployed configuration;

wherein said second section has a corresponding shape to said first section such that said second section nests fully within said first section when said wagon is in said stored configuration; and, wherein a stored securing means is provided for securing said wagon in said stored configuration.

2. The wagon of claim 1, wherein said first section further comprises:

a planar first bottom panel;

a first sidewall extending upwardly from an outer perimeter edge of said first bottom panel along opposing lateral sides and a first fore end, such that said first aft end is open; and, a spring clip located at a central location of a bottom surface of said bottom panel adjacent to said first aft end;

wherein said first bench seat spans a distance between opposing inner sides of said first sidewall;

wherein a gap exists between an outer perimeter edge of said first bench seat and a perimeter edge of an inner side of said first sidewall, said gap configured to receive at least a portion of said second sidewall when said wagon is in said stored configuration;

wherein said handle is mounted to an outer surface at a center position of a bottom edge of said first sidewall;

wherein said spring clip is horizontally aligned with said handle such that said handle is capable of selectively mating with said spring clip; and, wherein each of said pair of pivot slots are located in a vertical orientation on opposing sides of said first sidewall.

3. The wagon of claim 2, said second section further comprises:

a planar second bottom panel;

a second sidewall extending upwardly from an outer perimeter edge of said second bottom panel along opposing lateral sides and a second aft end, such that said second fore end is open; and, a pair of cup holders each affixed to inner opposing sides of said second sidewall;

wherein said second bench seat spans a distance between opposing inner sides of said second sidewall; and, wherein said pair of pivoting ears are located on opposing vertically aligned positions on an upper location of said second sidewall.

4. The wagon of claim 3, wherein said first and second wheel assemblies further comprise:

a pair of wheels each rotatably attached to distal ends of an axle passing through said first bottom panel and said second bottom panel, respectively;

wherein said first wheel assembly resides within a first wheel well integral to said first bottom panel located at said first fore end; and, wherein said second wheel assembly resides within a second wheel well integral to said second bottom panel located at said second aft end.

5. The wagon of claim 4, wherein said deployed securing means further comprises:

a pair of side latches provided at opposing bottom corners of said first sidewall and said first bottom panel located at said first aft end and extending rearwardly therefrom; and, a pair of post portions provided at opposing bottom corners of said second sidewall and said second bottom panel located at said second fore end and protruding outwardly therefrom;

wherein said pair of side latches and said pair of post portions are horizontally aligned such that said pair of side latches engages said pair of post portions when said wagon is in said fully deployed configuration.

6. The wagon of claim 5, wherein said stored securing means further comprises:

a latch provided along an upper edge of said first sidewall located at said first fore end; and, a latch recess located upon a bottom surface of said second bottom panel located at said second aft end;

wherein said latch and said latch recess are horizontally aligned such that said latch engages said latch recess when said wagon is in said stored configuration.

7. The wagon of claim 6, wherein said pair of side latches and said latch each are spring-biased hook latches integrally molded to said wagon.

8. The wagon of claim 6, further comprising an adjustable seat belt assembly located on each of said first bench seat and said second bench seat.

9. The wagon of claim 6, further comprising a bottom panel cover configured to be removably placed over said first bottom panel and said second bottom panel when said wagon is in said fully deployed configuration.

10. A wagon, comprising:

a generally semi-ovular first section, comprising:
   a first fore end and a first aft end;
   a first bench seat located at said first fore end;
   a first wheel assembly;
   a handle having a first end pivotally mounted to and located at said first fore end and second end having a gripping element; and,
   a pair of pivot slots adjacent to said first aft end; and, a generally semi-ovular second section, comprising:
   a second fore end and a second aft end;
   a second bench seat located at said second aft end;
   a second wheel assembly; and,
   a pair of pivoting ears extending forwardly from said second fore end, each of said pair of pivoting ears has a pivot pin extending outwardly therefrom;

wherein each of said pivot pins engage a pivot slot to pivotally motion said second fore end relative to first aft end between a fully deployed configuration and a stored configuration;

wherein said first section and said second section are aligned along a coextensive longitudinal axis when said wagon is in said fully deployed configuration to provide a generally ovular shape;

wherein a deployed securing means is provided for securing said wagon in said fully deployed configuration;

wherein said second section has a corresponding shape to said first section such that said second section nests fully within said first section when said wagon is in said stored configuration; and, wherein a stored securing means is provided for securing said wagon in said stored configuration.

11. The wagon of claim 10, wherein said first section further comprises:

a planar first bottom panel;

a first sidewall extending upwardly from an outer perimeter edge of said first bottom panel along opposing lateral sides and a first fore end, such that said first aft end is open; and, a spring clip located at a central location of a bottom surface of said bottom panel adjacent to said first aft end;

wherein said first bench seat spans a distance between opposing inner sides of said first sidewall;

wherein a gap exists between an outer perimeter edge of said first bench seat and a perimeter edge of an inner side of said first sidewall, said gap configured to receive at least a portion of said second sidewall when said wagon is in said stored configuration;

wherein said handle is mounted to an outer surface at a center position of a bottom edge of said first sidewall;

wherein said spring clip is horizontally aligned with said handle such that said handle is capable of selectively mating with said spring clip; and, wherein each of said pair of pivot slots are located in a vertical orientation on opposing sides of said first sidewall.

12. The wagon of claim 11, said second section further comprises:

a planar second bottom panel;

a second sidewall extending upwardly from an outer perimeter edge of said second bottom panel along opposing lateral sides and a second aft end, such that said second fore end is open; and, a pair of cup holders each affixed to inner opposing sides of said second sidewall;

wherein said second bench seat spans a distance between opposing inner sides of said second sidewall; and, wherein said pair of pivoting ears are located on opposing vertically aligned positions on an upper location of said second sidewall.

13. The wagon of claim 12, wherein said first and second wheel assemblies further comprise:

a pair of wheels each rotatably attached to distal ends of an axle passing through said first bottom panel and said second bottom panel, respectively;

wherein said first wheel assembly resides within a first wheel well integral to said first bottom panel located at said first fore end; and, wherein said second wheel assembly resides within a second wheel well integral to said second bottom panel located at said second aft end.

14. The wagon of claim 13, wherein said deployed securing means further comprises:

a pair of side latches provided at opposing bottom corners of said first sidewall and said first bottom panel located at said first aft end and extending rearwardly therefrom; and, a pair of post portions provided at opposing bottom corners of said second sidewall and said second bottom panel located at said second fore end and protruding outwardly therefrom;

wherein said pair of side latches and said pair of post portions are horizontally aligned such that said pair of side latches engages said pair of post portions when said wagon is in said fully deployed configuration.

15. The wagon of claim 14, wherein said stored securing means further comprises:

a latch provided along an upper edge of said first sidewall located at said first fore end; and, a latch recess located upon a bottom surface of said second bottom panel located at said second aft end;

wherein said latch and said latch recess are horizontally aligned such that said latch engages said latch recess when said wagon is in said stored configuration.

16. The wagon of claim 15, wherein said pair of side latches and said latch each are spring-biased hook latches integrally molded to said wagon.

17. The wagon of claim 15, further comprising an adjustable seat belt assembly located on each of said first bench seat and said second bench seat.

18. The wagon of claim 15, further comprising a bottom panel cover configured to be removably placed over said first bottom panel and said second bottom panel when said wagon is in said fully deployed configuration.

* * * * *